Dec. 16, 1969 W. SAEGER ET AL 3,484,791

HIGH RESOLUTION ELECTROSTATIC RECORDING METHOD AND APPARATUS

Filed June 24, 1966

INVENTORS.
WALDEMAR SAEGER
MURRAY I. GOLD

BY

ATTORNEYS

United States Patent Office 3,484,791

Patented Dec. 16, 1969

3,484,791

HIGH RESOLUTION ELECTROSTATIC RECORDING METHOD AND APPARATUS

Waldemar Saeger, La Canada, and Murray I. Gold, Monterey Park, Calif., assignors to Xerox Corporation, Rochester, N.Y., a corporation of New York Filed June 24, 1966, Ser. No. 560,310
Int. Cl. G01d *15/06*
U.S. Cl. 346—74 4 Claims

ABSTRACT OF THE DISCLOSURE

Method and apparatus for electrostatically recording information signals wherein the duration of the video print pulse is preshortened prior to its coupling to the recording stylus by a time interval proportional to the apparent or effective recording stylus dimension in the direction of recording.

This invention relates to electrostatic recording apparatus and more particularly to an improved and electronic drive apparatus for actuating electrostatic recording styli.

The electrostatic recording process comprises the steps of printing, inking, and fixing. In the printing step information to be recorded is formed as indicia shaped electrostatic images on a high resistivity surface of a record sheet or web. Subsequently, during the inking step these previously deposited charged areas are rendered visible, i.e., developed, by the application of a finely powdered developing agent or ink which is attracted to the previously charged areas and retained thereover by electrostatic attraction. The third step, which is optional, comprises fixing the toner or developer powder adhering to the latent images on the record sheets. This step may comprise heating a specially coated record sheet and/or subjecting the powdered images thereon to a rolling pressure contact.

The size and shape of an electrostatic image formed on a record medium as a result of the energization of a recording stylus is a function of a combination of parameters including the size and shape of the respective electrodes, the polarity of the voltage applied to the respective stylus and the electric field intensity in the gap between the printing stylus and the backing electrode.

Particularly if the electrostatic recording process is employed where high resolution is a desirable feature, for example, facsimile systems, line or chart recorders, etc. the expansion of the deposited charge pattern due to the stylus dimensions has been a problem. Such expansion of the deposited charge pattern due to the stylus dimension often results in an overlapping of adjacent deposited charge patterns in response to closely spaced actuating pulses. This overlapping of adjacent charge patterns due to the expansion of the deposited charge pattern by the stylus dimension severely limits the resolution of a printing system, i.e., its ability to resolve closely spaced individual actuating pulses as distinct deposited charged areas. This spreading effect due to stylus dimensions may be somewhat minimized by reducing the physical dimensions of a stylus, however, as would be evident this solution is severely limited by practical physical limitations on the minimum size of recording stylus.

It is accordingly an object of the present invention to provide electrostatic recording methods and apparatus wherein the apparent or effective recording stylus dimension in the direction of recording is less than the corresponding physical dimension.

It is another object of the present invention to improve resolution in electrostatic recording apparatus.

It is another object of the present invention to reduce the effect of expansion of deposited charge pattern attributable to stylus dimensions in an electrostatic recording system.

It is yet another object of the present invention to provide simplified circuitry for controlling the expansion of deposited charge patterns attributable to stylus dimension in electrostatic recording apparatus.

Other objects of the present invention will become apparent from the following detailed description taken in conjunction with the accompanying drawings in which.

Figure 1:
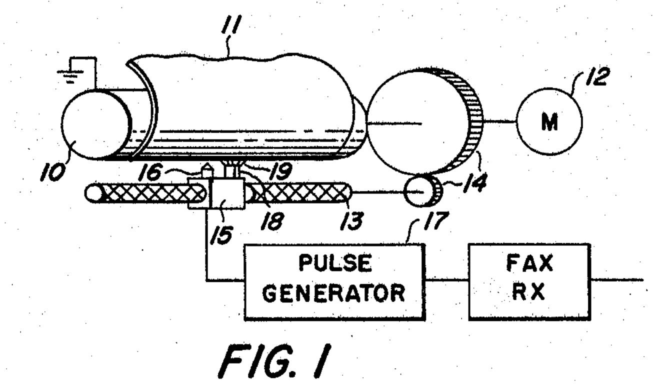
FIGS. 1 and 1A show partial block diagrams of electrostatic recording apparatus utilizable in accordance with the principles of the present invention.

FIG. 1 illustrates an electrostatic facsimile recorder for the purpose of illustrating a typical environment in which the present invention may be employed. A drum 10 preferably formed from electrically conductive material is covered with a sheet of insulating record material 11. Drum 10 is rotatably supported and adaptive to be driven by a motor 12 which also drives a lead screw 13 through gears 14. An insulating carriage 15 rides on lead screw 13 and carries a recording electrode or stylus 16 which is adapted to be drawn across the surface of the insulating material 11 as drum 10 rotates. A high voltage pulse width controlling generator 17 as hereinafter to be more fully explained supplies voltages pulses of controlled duration to stylus 16 in response to received video or other recording signals. The voltage pulse applied to stylus 16 causes electrostatic charge to be deposited on insulating material 11 in a pattern determined by the information format applied to pulse generator 17.

Figure 1A:
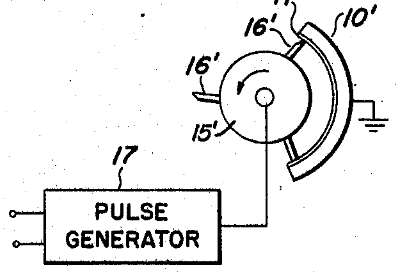

In order to develop or render the latent charge patterns visible, a permanent magnet 18 is mounted on carriage 15 adjacent to the surface of drum 10. Magnet 18 carries on its pole proximate record sheet 11 a so-called magnetic brush 19 which comprises a mixture of iron filings and finely divided pigmented resin particles. The resin particles commonly referred to as toner are electrostatically charged by contact with the iron filings to a single predominate polarity preferably opposite to that of the latent charge deposited by the stylus 16 on the insulating material 11. As the magnetic brush 19 passes over an area of previously deposited latent electrostatic charge, resin particles are attracted to the areas of charge and adhere thereon thus producing a visible image. As described such an electrostatic recorder may, for example, comprise a facsimile recorder in which a remote conventional facsimile transmitter selectively actuates pulse generator 17 with conventional video and control signals. FIG. 1A illustrates a high speed electrostatic recording apparatus utilizing in accordance with the principles of the present inventoin. The styli 16' are equally spaced about the periphery of drum 15' and cooperably juxtapositioned with curved backing electrode 10'. As the drum 15' rotates, suitable switching means selectively couples recording signals from pulse generator 17 to the appropriately positioned styli 16' thus creating a latent image on record 11. More detailed information relating to the recording process will be given later.

Figure 2:
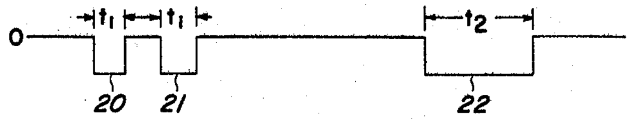
FIG. 2 illustrates conventional recording waveforms utilizable in the recording apparatus illustrated in FIG. 1.

FIG. 2 illustrates a portion of a typical waveform which might be applied to recording stylus 16. Two closely spaced short duration pulses 20 and 21, each having a duration $t_1$, and a longer pulse 22, having a duration $t_2$, are shown. The pulses will typically, although not necessarily, be of a negative polarity and have an amplitude in the order of 500 to 1,000 volts. Depending on design configuration and parameters of the recording apparatus, pulses having a magnitude less than a threshold value, for example, in the order of 500 volts, will not be effective in transferring charge from stylus 16 to insulating material 11. These pulses are ordinarily produced by a pulse generator such as a vacuum tube switch or a transistor switch.

Figure 3:
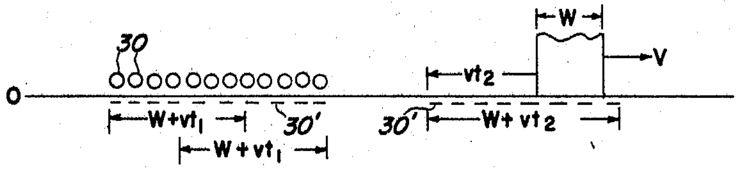
FIG. 3 illustrates recording operations of the apparatus illustrated in FIG. 1 in response to the waveforms shown in FIG. 2.

FIG. 3 illustrates the latent record or latent print image produced when the pulses shown in FIG. 2 are applied to a recording stylus 16 which has a width W and a relative velocity V with respect to the insulating material or record sheet 11. As schematically illustrated, the respective charge patterns 30' deposited by pulse 22 and by pulses 20 and 21, which are made visible by attraction of toner particles 30, each extends over covers a dimension proportional to the duration of the print pulse. The length of each charge pattern is equal to the dimension W of the stylus pulse the distance transversed by the stylus during the time duration of the respective print pulse, i.e., $W+Vt_1$ or $W+Vt_2$ where V and $t$ are the velocity and the pulse time duration respectively. The desired length of deposited charge pattern is normally proportional only to the pulse duration, i.e., only $Vt_1$ or $Vt_2$. Because of the expansion of the size or spreading effect of the deposited charge pattern by the stylus dimension W, the charges deposited by the pulses 20 and 21 are seen to overlap. Thus, the illustrated system would be incapable of resolving pulses which are as closely spaced as the illustrated pulses 20 and 21. Resolution can obviously be improved by reducing the dimension W of the stylus 16 or decreasing its velocity but there are practical limitations on how far these processes can be carried.

Figure 4:
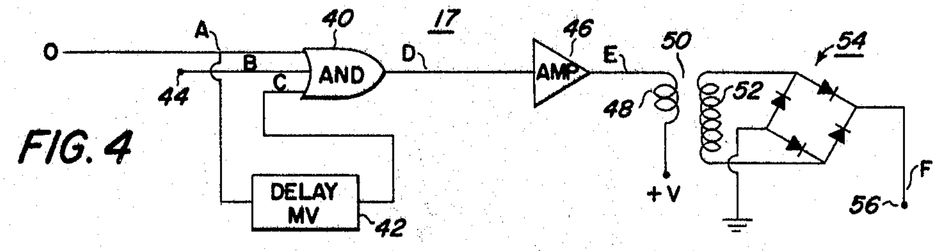
FIG. 4 is a schematic diagram of print pulse control apparatus in accordance with the preferred embodiment of the present invention.

Referring now to FIG. 4 there is shown a schematic or block diagram of the print pulse control apparatus 17 in accordance with the principles of the present invention. As known in the electrographic recording art the pulsing or modulation of an electrographic stylus during writing operations involves the application of a high voltage pulse to the stylus. For example, the print pulse may be equal to or greater than 1,000 volts. By known techniques the application of such high voltage print pulses results in the deposition of a latent elestrostatic image on suitable record paper cooperably juxtapositioned with the recording stylus. Since the stylus has a finite width, for example, in the order of 3 mils, a latent pattern generated in response to a print signal is usually extended by an amount proportional to the effective width of the stylus, the velocity of the stylus relative to the paper and the print pulse duration. This is, as was hereinbefore described, undesirable since the width of all vertical lines would be increased by an amount proportional to the stylus width and pulse duration velocity product. In accordance with the principles of the present invention a print pulse width is selectively decreased by an amount proportional to the width of the stylus thus resulting in the preshortening or shrinking of the print pulse.

As shown the incoming video signal is coupled to one input of AND gate 40 include the delayed video pulse generated by delay multivibrator 42 and a suitable source of timing pulses coupled to terminal 44. The output of AND gate 40 is coupled to an amplifier 46 which has its output terminal coupled to the primary winding 48 of transformer 50. The secondary winding 52 of transformer 50 is coupled to the inputs of a bridge rectifier 54. As shown the full wave bridge rectifier comprises four diodes in which a first pair of diagonally opposite diode pair junctions are coupled to the respective ends of the secondary winding 52 and the other pair of diode junctions are coupled to the output terminal 56 and to a source of reference potential, for example, ground, respectively. The logical AND gate, delay multivibrator, amplifier and rectifier circuits may comprise any circuit known in the art for accomplishing the indicated circuit function.

Figure 5:
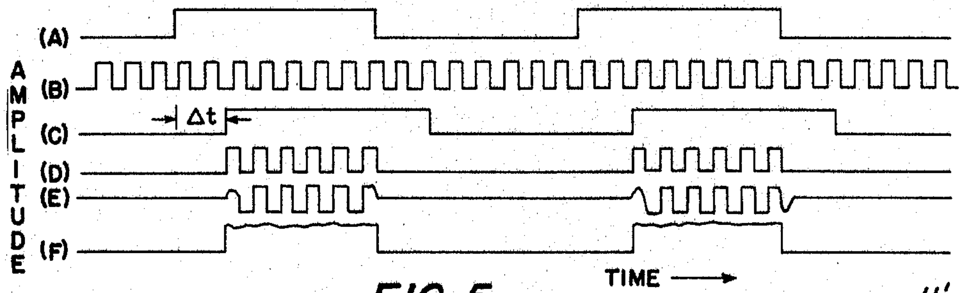
FIG. 5 illustrates a series of voltage-time waveforms useful in understanding the operation of the print pulse control apparatus illustrated in FIG. 4.

Referring now to FIG. 5 the operation of the print pulse control circuit apparatus illustrated in FIG. 4 will now be explained. The various waveforms of FIG. 5 are denominated A, B, C, D, E, and F, and as such respectively correspond to the waveform which would typically appear at the various points similarly denominated in FIG. 4. As shown a substantially square wave video pulse wavetrain A would appear during operation on the incoming video line and be applied to one input of AND gate 40. This same waveform A is coupled to the input of delay multivibrator 42 and after a predetermined time interval determined by the delay interval is coupled from the output of multivibrator 42 to another input of AND gate 40. In the preferred embodiment the delay interval of multivibrator 42 would be equal to the time required for the record paper to effectively travel from the leading edge to the trailing edge of the electrostatic pen or stylus in the direction of recording. As shown waveform A is thus delayed a predetermined amount and is substantially regenerated at time $\Delta T$ after the leading edge of waveform A. As shown waveform B is a square wave clock train, for example, which may comprise a 30 kilohertz pulse repetition frequency. Waveform B may, for example, be generated by a free running multivibrator or oscillator.

As is known in the art the output from a logical AND gate is generated whenever each one of the inputs thereof is simultaneously present and corresponds to a logical "one." Waveform D illustrates the output of AND gate 40 for that period when each of the inputs A, B, and C are simultaneously present and correspond to the logical "one" signal level. As shown the waveform D corresponds to that portion of waveform B during the time coincidence of waveform A and waveform C in the logical "one" or high signal level or state. The waveform D is amplified in buffer amplifier 46 and coupled to the primary winding 48 of transformer 50. Waveform E appears across the secondary winding 52 of transformer 50 and in the normal manner would be rectified through the operation of the multidiode full wave rectifying bridge. By comparing waveform F which is coupled from output terminal 56 to the electrographic stylus with waveform A, the incoming video pulse, it may be seen that the incoming video pulse is preshortened or shrunk by an amount corresponding to the delay interval of multivibrator 42.

By employing the print pulse control method and apparatus of the present invention, the print pulses applied to the electrographic stylus may be preshortened a predetermined amount, preferably equivalent to the time required for the paper to traverse from the leading edge to the trailing edge of the stylus. During recording the stylus in normal recording operation would add back this width, i.e., would deposit a charge pattern equivalent to the width of the print pulse plus the width of the stylus and thus the latent image generated would be a faithful reproduction corresponding to the input signal. While in the preferred embodiment the delay of the multivibrator and thus the preshortening of the print pulse is proportional to the width of the stylus in the direction of recording, it would be possible to vary the width of the delay multivibrator to achieve any intermediate delay and thus any desirable variation in the pulse duration relative to the stylus dimension. Such variation may correspond to a delay greater than or less than the effective stylus dimension in the direction of recording and thus may be employed to electrically shorten or lengthen the dimension of the stylus relative to its physical dimension in the direction of recording.

Insulating material 11 should have sufficiently high resistivity to retain an electrostatic charge and should be as thin as possible. It may be in the form of a thin sheet of material attached to drum 10 or may be a coating applied to drum 10. A preferred form of insulating material 11 comprises a sheet of paper which has been impregnated to increase its electrical conductivity and which has been coated or impregnated on the surface to be contacted by stylus 16 with a very thin layer of insulating resin. Such papers are described in the patent literature and are commercially available under the name Videograph Paper.

Development of the electrostatic charges formed on the insulating material 11 may be by magnetic brush development as hereinabove explained in conjunction with FIGURE 1, however, cascade development, liquid development, or any of the other known means for developing electrostatic images may likewise be employed. Each of the methods specifically mentioned is used in one or more commercial electrostatic office copying machines and suitable developer materials may be secured from the manufacturers of these machines. All manufacturers supply materials suitable for the development of negative charges to the exclusion of positive charges and some manufacturers also supply material suitable for the development of positive charges to the exclusion of negative charges.

The apparatus of FIGURE 1 is shown for illustrative purposes only since any other machine configuration which provides relative motion between an electrical recording stylus and a sheet of insulating material may be employed equally well. Such machines may be used for facsimile recording, alphanumeric character printing, and many other purposes. A single stylus may be employed or a multiple array of stylii. The stylus dimensions would be chosen in accordance with the contemplated application of the apparatus. The circuits employed in practicing the described method and apparatus may depart considerably from those described or illustrated as will be apparent to those skilled in the circuit art. Even where the stylus dimension W can be made small enough to provide the desired resolution without resort to the present invention, the present invention will still provide highly desirable benefits in terms of circuit simplicity and economy. Where appropriate recording signals are obtainable at the output of the logical AND gate, the periodic timing pulses coupled to terminal 44, the transformer 50 and bridge rectifier would not be required as the preshortening of the print pulse may be accomplished by AND gating the underlayed video signal and the delayed video signal. As other modifications may be incorporated by those skilled in the art in the arrangement of logical circuitry for practicing the disclosed invention, it is applicants' intention to be limited only as indicated by the scope of the appended claims.

What is claimed is:

1. In an electrostatic recording apparatus including at least one electrostatic recording stylus having a fixed width in a predetermined direction adapted for translatory motion in said predetermined direction relative to a record medium and additionally including print pulse generating means responsive to the electric signals to be recorded for selectively coupling a predetermined polarity print pulse of sufficient duration and amplitude to effect charge transfer from said stylus to said record medium, the improvement comprising print pulse duration control means responsive to said electric signals to be recorded for selectively decreasing the duration of said print pulse relative to the duration of said electric signals to be recorded by an interval substantially represented by the time required for a point on the record medium to move a distance equal to said fixed width of said stylus in said predetermined direction.

2. A pulse generator for selectively energizing an electrostatic recording stylus comprising input terminal means for receiving electric signals to be recorded, a logical AND gate, means for coupling said input terminal means to one input of said logical AND gate, means for delaying signals coupled to said input terminals means a predetermined time interval, means for coupling said delayed electric signals to another input of said logical AND gate, means for coupling a source of periodic timing waveforms to another input of said logical AND gate, means for coupling a transformer including a primary and secondary winding, means for coupling the output of said logical AND gate to said primary winding, rectifier means for rectifying signals appearing across said secondary winding of said transformer, and means for coupling the output of said rectifier means to said recording stylus.

3. The method of electrostatically recording information on an insulating record member comprising the steps of generating electric signals corresponding to the information to be recorded, preshortening the duration of each of said electric signals by an amount substantially equal to the interval required for a point on said record member to move a distance equal to the effective width of an electrostatic recording stylus in the direction of recording to generate a print pulse in response to each of said electric signals, and applying said print pulse to an electrostatic recording stylus during relative translatory motion thereof over a surface of an insulating record member.

4. An electrostatic recording apparatus comprising:

at least one recording stylus having a leading and lagging edge in a predetermined direction of recording, means for moving a record medium adjacent to said recording stylus in said predetermined direction, input terminal means for receiving an electric signal to be recorded, print pulse duration control means responsive to said electric signals to be recorded for effectively generating a print pulse having a duration less than said electric pulse by an amount substantially equal to the time required for the record medium to effectively move from said leading edge to said trailing edge of said stylus in the direction of recording.

References Cited

UNITED STATES PATENTS

| | | | |
|---|---|---|---|
| 2,729,699 | 1/1956 | Long | 178—6.6 |
| 3,074,066 | 1/1963 | Conerly | 346—74 |
| 3,188,648 | 6/1965 | Cecil | 340—174.1 |
| 3,230,303 | 1/1966 | Macouski | 346—74 |
| 3,308,473 | 3/1967 | Sawazaki | 346—74 |
| 3,382,492 | 5/1968 | Santana | 340—174.1 |

BERNARD KONICK, Primary Examiner

JOSEPH F. BREIMAYER, Assistant Examiner

U.S. Cl. X.R.

178—6.6

PO-1050
(5/69)

UNITED STATES PATENT OFFICE
CERTIFICATE OF CORRECTION

Patent No. 3,484,791 Dated January 16, 1970

Inventor(s) W. Saeger et al

It is certified that error appears in the above-identified patent and that said Letters Patent are hereby corrected as shown below:

Column 6, line 16, delete "means for coupling".

SIGNED AND SEALED
MAY 12 1970

(SEAL)
Attest:

Edward M. Fletcher, Jr.
Attesting Officer

WILLIAM E. SCHUYLER, JR.
Commissioner of Patents